Sept. 18, 1923.
W. BROWN
COMBUSTION ENGINE
Filed Sept. 17, 1920
1,467,998
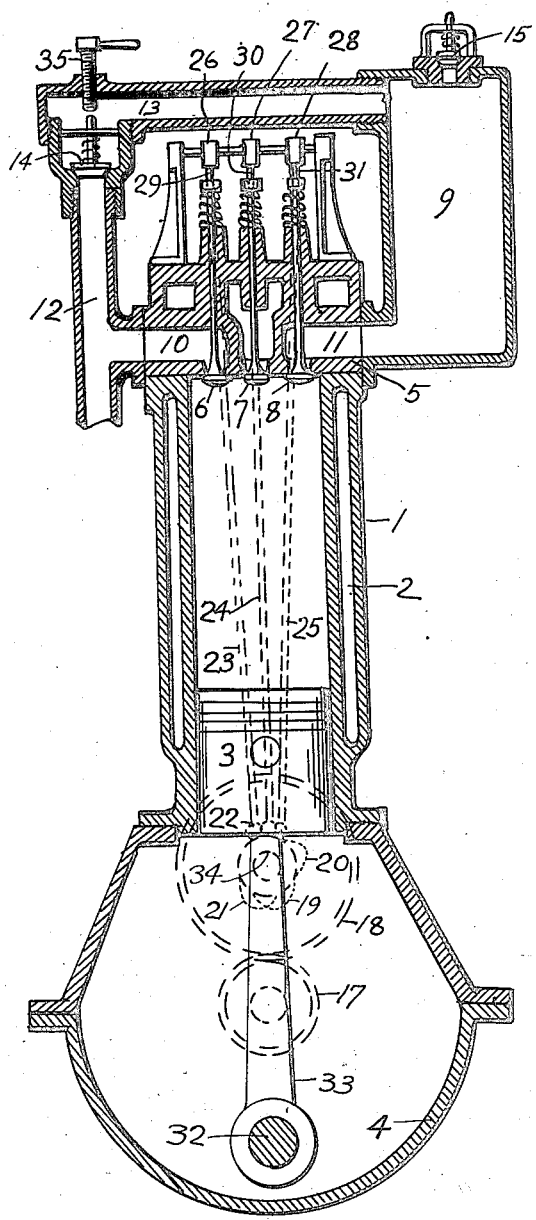
Inventor
W. Brown,
By H. R. Kerslake
Attorney Patented Sept. 18, 1923.

1,467,998

UNITED STATES PATENT OFFICE.

WILLIAM BROWN, OF ANNANDALE, NEW SOUTH WALES, AUSTRALIA.

COMBUSTION ENGINE.

Application filed September 17, 1920. Serial No. 410,885.

*To all whom it may concern:*

Be it known that I, WILLIAM BROWN, a subject of the King of Great Britain and Ireland, residing at 44 Briellet Street, Annandale, near Sydney, New South Wales, Australia, have invented certain new and useful Improvements in Combustion Engines, of which the following is a specification.

This invention relates to four-stroke cycle combustion engines in which motive power is obtained from a mixture of combustible gases or vapors drawn from a carburetter or other source of supply which is compressed, ignited, and expanded in the cylinder or cylinders thereof.

The invention has relevance to a new method of operating such engines and to means for enabling said method to be carried out. By my said method of operation of such engines a greater quantity of the available heat of the combustible charge burnt in the cylinder or cylinders is converted into power than is the case when such engines are operated by the method at present known. The method as is now generally employed consists in compressing a combustible mixture of gases or vapors and exploding same in the cylinder or cylinders of the engine. The pressure which is exerted on the piston by the explosion causes it to move on the power stroke and the crank is carried through a half revolution. About the time the piston has completed its power stroke and the piston is moving on the exhaust stroke the exhaust valve opens and the products of combustion of the burnt charge are expelled into the atmosphere. When the piston commences its suction stroke the inlet valve is opened and the exhaust valve is closed and a fresh charge is admitted to the cylinder or cylinders during the whole of such stroke of the piston. The momentum of the fly wheel carries the piston through its suction stroke and the revolution of the fly wheel continuing the piston is moved on its compression stroke during which both the inlet and exhaust valves of the engine are closed. The whole of the charge admitted to the engine cylinder is then compressed and its temperature increased to the point required for ignition, and it is ignited when the piston has neared the end of its compression stroke. Only one explosion occurs in the cylinder or cylinders of the engine for every two revolutions of the crank and during each cycle only one power stroke is obtained.

In my method of operating such engines the inlet valve is not opened during the whole of the suction stroke of the piston thereof but only for approximately the first half of such stroke. During the other half of such stroke of the piston the combustible charge for the cylinder is drawn from a storage reservoir which is in communication with the cylinder during the latter half of the suction stroke of the piston. The valve controlling the port leading from the storage chamber to the cylinder remains open up to the point at or about which the piston will have moved through the first half of its compression stroke. Whilst the storage reservoir is open to the cylinder during part of the compression stroke of the piston part of the charge admitted to the engine cylinder is returned to the storage reservoir to be again transferred to the cylinder after the inlet valve of the engine has been closed on its succeeding suction stroke. The remainder of the charge left in the cylinder is compressed, ignited, and the gases resulting from the explosion are permitted to expand and are expelled from the cylinder during the exhaust stroke of the piston.

I am aware that four-stroke cycle combustion engines are already known in which a portion of the charge admitted to the cylinder from a storage reservoir during the suction stroke of the piston is expelled to said reservoir during a portion of the compression stroke of the piston and the remainder is compressed and exploded in the ordinary manner. In such engines, however, the inlet valve remains open for the whole of the suction stroke of the piston and during a portion of its compression stroke and part of the charge admitted to the cylinder is returned to the reservoir from which it was originally drawn through the inlet valve. By my method of operating four-stroke cycle combustion engines the inlet valve is not open during the whole of the suction stroke and for part of the compression stroke of the piston; it is only open for approximately the first half of the suction stroke of the piston.

The accompanying drawing shows one embodiment of means for carrying out the invention applied to an internal combustion engine in which the cylinder 1 has a water jacket 2. The piston 3 is connected to the crank pin 32 by the connecting rod 33 and is capable of reciprocation within the cylinder 1 which is open at its bottom to the crank case 4. At its head the cylinder is provided with a cover 5 having seatings for the inlet valve 6, the exhaust valve 7 and the valve 8 which controls the port opening between the interior of the cylinder and the combustible charge storage chamber 9. Passages 10 and 11 in the cover 5 are in communication respectively with the induction pipe 12 from a carburetter or other source of fuel supply and the storage chamber 9. A by-pass 13 fitted with a non-return valve 14 connects the induction pipe 12 and passage 10 with the top of the storage chamber 9. The head of this chamber may also be furnished with a safety valve 15 and also with a screw-down plug 35 or the like which may be brought into contact with the spindle of the non-return valve 14 to prevent such valve opening as it would otherwise tend to do when the valve 8 were opened. If, however, it should be desired to admit a combustible charge to the reservoir 9 through the valve 14 from the induction pipe 12 it will only be necessary to raise the screw-down plug 35 out of contact with the non-return valve 14 so that when pressure is exerted on the tappet lever 28 to open the valve 8, the suction of the engine will cause the valve 14 to open also.

On the crank shaft is a gear wheel 17 meshing with a gear wheel 18 on the half speed shaft 34. Upon the latter shaft are mounted three cams 19, 20 and 21 which are adapted respectively to contact at predetermined times with the rollers 22 on the lower ends of the tappet rods 23, 24 and 25 connected respectively with the tappet levers 26, 27 and 28 which are adapted to contact respectively with the spindles 29, 30 and 31 of the valves 6, 7 and 8 to open said valves when the tappet rods 23, 24 and 25 are moved upwardly by the operation of the cams 19, 20 and 21.

The cam 19 is shaped and set to operate the inlet valve 6 in proper timing with the movements of the piston 3, but to allow said valve to close at approximately the time when the piston will have reached the completion of the first half of its suction stroke. Similarly the cam 20 is shaped and set to operate the exhaust valve 7 to enable the products of combustion of the charge in the cylinder to be discharged therefrom on the exhaust stroke of the piston 3. As the valve 8 is only to be opened approximately at the time the inlet valve 6 is closed on the suction stroke of the piston 3 and to be closed at or about the point at which the piston will have completed the first half of its compression stroke the cam 21 which operates this valve is so shaped and set to operate the valve 8 in this manner.

If the movements of the inlet and storage chamber valves are to be controlled by governor mechanism operating on the hit-or-miss principle, such mechanism may be constructed and set to open such valves at proper timing when the engine is at normal speed, and to control the movements of the valves for admitting or cutting off supplies of combustible charges to the engine cylinder depending on the speed of the engine.

It will be evident that the invention may be carried out by means other than those shown in the drawings and described herein, and I wish it to be understood that the principal character of the invention resides in the method of operation which is disclosed herein and that the means for effectuating same may be varied to suit practical working conditions of four-stroke cycle combustion engines of different types.

As only a portion of the combustible charge admitted to the cylinder is compressed and exploded, the products of the exploded charge are permitted greater expansion than the expansion allowed in four-stroke cycle combustion engines as ordinarily operated at present. The thermal efficiency of such engines is therefore increased when they are operated with my method. Further the expanded gases are allowed to cool to a greater extent by the utilization of my method, and they are thus expelled from the cylinder of the engine in a cooler condition than they are expelled from engines at present in use.

What I claim as my invention and desire to secure by Letters Patent is:—

1. In a combustion engine, a cylinder having ports therein, a piston reciprocally mounted in said cylinder, a main inlet valve controlling one of said ports, a gaseous fuel reservoir communicating with another of said ports, a valve in the last mentioned port controlling passage of gaseous fuel between the cylinder and the reservoir, actuating means for the inlet valve, actuating means for the second mentioned valve operating to open the latter substantially coincident with the closure of the main inlet valve to establish communication between the cylinder and reservoir and to maintain said communication throughout a portion of the compression stroke of the piston, a fuel induction pipe associated with the first mentioned port, a non-return valve adapted to permit admission of combustible gas to said reservoir from the induction pipe during the latter part of the suction stroke of the piston and while the reservoir is in communication with the engine cylinder.

2. In a combustion engine as claimed in claim 1, the combination with said non-return valve of an adjustable plug adapted to be brought into contact with said non-return valve to prohibit admission of said combustible gas to said reservoir.

In testimony whereof I affix my signature.

WILLIAM BROWN.